US012111179B2

(12) United States Patent
Collins et al.

(10) Patent No.: US 12,111,179 B2
(45) Date of Patent: Oct. 8, 2024

(54) ORGANIZING MAPPED REGIONS INTO DISCRETIZED SEGMENTS FOR AUTONOMOUS SYSTEMS AND APPLICATIONS

(71) Applicant: NVIDIA Corporation, Santa Clara, CA (US)

(72) Inventors: Galen Collins, Seattle, WA (US); Vladimir Shestak, Boulder, CO (US)

(73) Assignee: NVIDIA CORPORATION, Santa Clara, CA (US)

( * ) Notice: Subject to any disclaimer, the term of this patent is extended or adjusted under 35 U.S.C. 154(b) by 372 days.

(21) Appl. No.: 17/659,633

(22) Filed: Apr. 18, 2022

(65) Prior Publication Data
US 2023/0332923 A1 Oct. 19, 2023

(51) Int. Cl.
G06F 16/00 (2019.01)
G01C 21/00 (2006.01)
G06F 16/22 (2019.01)
G06F 16/29 (2019.01)

(52) U.S. Cl.
CPC ..... *G01C 21/3881* (2020.08); *G01C 21/3878* (2020.08); *G06F 16/2219* (2019.01); *G06F 16/29* (2019.01)

(58) Field of Classification Search
CPC .................................................. G06F 16/2219
See application file for complete search history.

(56) References Cited

U.S. PATENT DOCUMENTS

2017/0364450 A1* 12/2017 Struttmann ........... H04L 9/3297

* cited by examiner

*Primary Examiner* — Ajith Jacob
(74) *Attorney, Agent, or Firm* — Maschoff Brennan

(57) ABSTRACT

In various examples, a method to manage map data includes storing a map of a geographic area using an immutable tree. The immutable tree comprises a plurality of nodes stored using a distributed hash table. The plurality of nodes include a plurality of map tiles. At least two map tiles of the plurality of map tiles cover different geographic subregions of the geographic area of the map. The method includes hosting one or more binary large objects (BLOBs) that correspond to the plurality of map tiles in an origin data plane. The method includes making the one or more BLOBs available for distribution to one or more client devices using a content delivery network (CDN).

21 Claims, 13 Drawing Sheets

500

```
TileManifest : {
  <TileIndex> : {
      Layers: [
          Name: "<the well known name of this layer>",
          Hash: "<hash of the layer manifest>",
          Url: "<location of the layer manifest payload>",
      ],
      Rectangle: [<lat lon region this map tile covers>]
  }
}

LayerManifest : {
  Name: "<the well known name of this layer>",
  Items: [
      Id: "<the unique identifier of this segment>",
      Hash: "<hash of the segment payload>",
      Url: "<location of the actual segment payload>"
  ],
}
```

```
#----------------------------------------------------------------
# Bucket Schema
#----------------------------------------------------------------
$root        := /nvmap/$schema/$entity
$schema      := v3 | v4
$entity      := $tile | $layer | $payload
$tile        := t/$id/manifest
$payload     := p/$id
$layer       := l/$tile.id/$layer_name
$id          := hash(data)

#----------------------------------------------------------------
# Examples
#----------------------------------------------------------------

/nvmap/v3/t/7b89c2a...5865647/manifest
/nvmap/v3/l/7b89c2a...5865647/lidar_giraffe_plane
/nvmap/v2/p/6e4b121...b5866a5
```

```
type Version { string version_id, int64 timestamp }
type Node { uint64 x, y, list<Version> versions }
type Matrix { string version_id, list<Node> neighbors }
```

> STORING A MAP OF AN AREA USING AN IMMUTABLE TREE COMPRISING A PLURALITY OF NODES STORED USING A DISTRIBUTED HASH TABLE, THE PLURALITY OF NODES INCLUDING A PLURALITY OF MAP TILES, WHERE AT LEAST TWO MAP TILES COVER DIFFERENT SUBREGIONS
> 902

> HOSTING ONE OR MORE BLOBS THAT CORRESPOND TO THE MAP TILES IN AN ORIGIN DATA PLANE
> 904

> MAKING THE ONE OR MORE BLOBS AVAILABLE FOR DISTRIBUTION TO ONE OR MORE CLIENT DEVICES USING A CDN
> 906

FIGURE 9

ORGANIZING MAPPED REGIONS INTO DISCRETIZED SEGMENTS FOR AUTONOMOUS SYSTEMS AND APPLICATIONS

BACKGROUND

This disclosure relates generally to organizing mapped regions into discretized, more easily distributable and consumable segments for autonomous systems and applications.

Autonomous and semiautonomous vehicles, also known as self-driving cars, driverless cars, advanced drive assistance vehicles, or robotic cars, drive from a source location to a destination location without requiring a human driver to control and navigate the vehicle. Automation of driving is highly complex and extremely challenging due to several reasons. For example, autonomous vehicles use sensors to make driving decisions on the fly, but vehicle sensors cannot observe everything all the time. Vehicle sensors can be obscured or occluded by corners, rolling hills, and other vehicles, objects, or road users (pedestrians, animals, bicyclists, etc.). Vehicle sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed. Autonomous vehicles can use map data to determine some of the above information instead of or in addition to relying on sensor data.

SUMMARY

Embodiments of the present disclosure relate to organization and distribution of map data as consumable, discretized segments ("map tiles").

In an example embodiment, a method to manage map data includes storing a map of a geographic area using a data structure configured as an immutable tree that includes a plurality of nodes stored using a distributed hash table. The plurality of nodes include a plurality of map tiles, at least two map tiles of the plurality of map tiles covering different geographic subregions of the geographic area of the map. The method includes hosting one or more binary large objects (BLOBs) that correspond to the plurality of map tiles in an origin data plane. The method includes making the one or more BLOBs available for distribution to one or more client devices using one or more content delivery networks (CDNs).

In another example embodiment, a system includes one or more processors to perform or control performance of operations. The operations include storing a map of a geographic area using an immutable tree that includes a plurality of nodes stored in a distributed hash table. The plurality of nodes include a plurality of map tiles and at least two maps tiles of the plurality of map tiles cover different geographic subregions of the geographic area of the map. The operations include hosting BLOBs corresponding to the plurality of map tiles in an origin data plane. The operations include distributing the BLOBs to client devices through a CDN.

BRIEF DESCRIPTION OF THE DRAWINGS

The present systems and methods for organizing mapped regions into discretized, more easily distributable and consumable segments for autonomous systems and applications are described in detail below with reference to the attached drawing figures, wherein:

FIG. 5A illustrates an example schema defining a tile store as an object graph, in accordance with one or more embodiments of the present disclosure;

FIG. 5B illustrates an example schema 510 of an origin data plane storage, in accordance with one or more embodiments of the present disclosure;

FIG. 8 illustrates an example schema of a tile compatibility matrix that may be implemented to follow historical paths;

FIG. 9 is a flow diagram showing a method to manage map data, according to one or more embodiments of the present disclosure;

DETAILED DESCRIPTION

Figure 1:
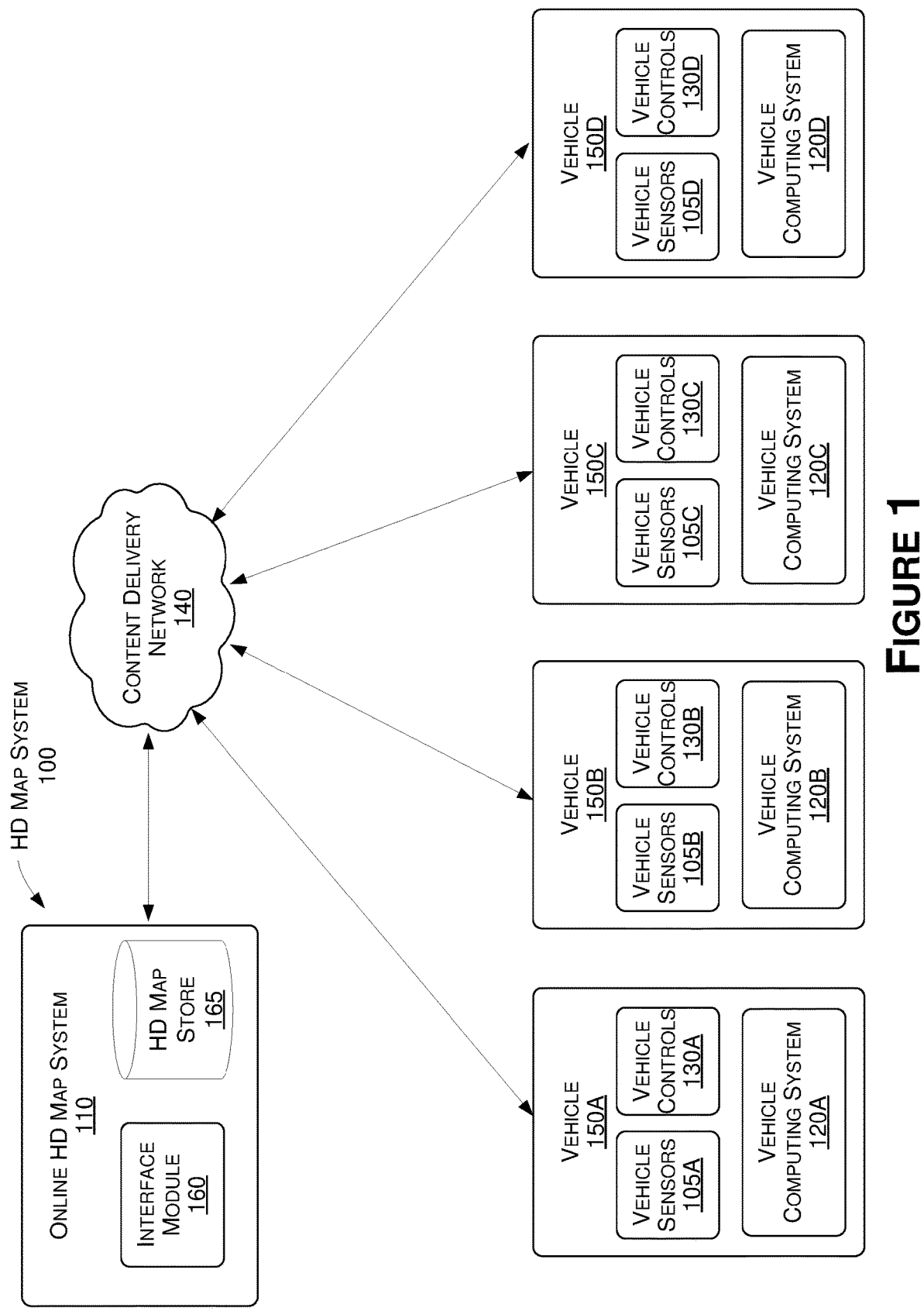
FIG. 1 illustrates an example overall system environment of an HD map system that may interact with multiple vehicles, in accordance with one or more embodiments of the present disclosure.

Map data used by autonomous vehicles for, e.g., navigation, may represent large portions of the globe. Some map systems for autonomous vehicles require vehicles to download an entire map, which may be infeasible due to client memory limitations and/or network bandwidth limitations. As such, it may be beneficial for autonomous vehicles to prioritize downloading discretized portions of the map, rather than the entire map, such as the specific portions needed to drive autonomously or partially autonomously.

Accordingly, one or more embodiments herein may organize larger cohesive map files into discretized tiles, each of which individually represents a different portion of the map, and may allow clients (e.g., running on or at an autonomous vehicle) to request specific parts of the map. These and other embodiments may allow fusion, editing, and updates of the map to occur on tiles and/or may allow map validation to be performed on tiles which may allow issues with parts of the map to be isolated.

In one or more embodiments, the tiles may be managed with manifests that describe and track the status of a set of tiles for a given area, allowing clients (e.g., autonomous vehicles) to fetch the correct version of each area. These and other embodiments may separate a control plane used to access and track map data from the map data itself.

Alternatively or additionally, one or more embodiments herein may implement a mechanism, such as a tile compatibility matrix, for maintaining compatibility of each tile with its neighbors, since each tile may be updated asynchronously with the tiles around it. This approach may ensure that clients are able to find a correct and compatible connected set of tile versions, and may allow producers to edit and create tiles at will, as long as the tile compatibility matrix is maintained. These and other embodiments may facilitate continuous, continual, and/or ongoing updates to a map's tiles while the map is in use by multiple autonomous vehicles, such as a million or more autonomous vehicles.

Each map tile may include content such as one or more layers and/or one or more segments and may be managed by a corresponding tile manifest. Each tile manifest may identify the one or more layers of the corresponding map tile and the subregion covered by the corresponding map tile and may include for each layer its name, a hash of its layer manifest, and a uniform resource locator (URL) of the layer manifest payload. Each layer may include one or more items, or segments, and may be managed by a corresponding layer manifest. Each layer manifest may identify the one or more items of the corresponding layer and may include for each item a unique ID of the item, a hash of the item payload, and a URL of the item payload.

In general, the map may be stored as an immutable tree by storing nodes of the map (e.g., payloads of the various content of the map tiles) in a distributed hash table. Path copying may be used to efficiently update the immutable tree. The payloads of the various content may be stored as binary large objects (BLOBs) in an origin data plane. The BLOBs may be distributed to client devices through a content delivery network (CDN).

A tile compatibility matrix may be generated and published for each version of each map tile to the CDN. Each tile compatibility matrix may identify one or more versions of each neighbor map tile that are compatible and/or consistent with a given map tile. When a client device is in a given version of a map tile it can simply request the compatibility matrix for the given version and then find a valid path to a corresponding neighbor tile using the compatibility matrix.

FIG. 1 illustrates an example overall system environment of an HD map system 100 that may interact with multiple vehicles, according to one or more embodiments of the present disclosure. The HD map system 100 may comprise an online HD map system 110 that may interact with a content delivery network(s) (CDN(s)) 140 and/or two or more vehicles 150 (e.g., vehicles 150A-150D) of the HD map system 100. The vehicles 150 may be autonomous vehicles, semi-autonomous vehicles, or non-autonomous vehicles. An example embodiment of the vehicles 150 is illustrated and described with respect to FIGS. 10A-10D. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

With continued reference to FIG. 1, the online HD map system 110 may be configured to receive sensor data that may be captured by vehicle sensors 105 (e.g., 105A-105D) of the vehicles 150 and combine data received from the vehicles 150 to generate and maintain HD maps. Alternatively or additionally, the HD maps may be generated and/or maintained in other ways. The online HD map system 110 may be configured to distribute HD map data directly or through the CDN 140 to the vehicles 150 for use in driving the vehicles 150. In some embodiments, the online HD map system 110 and/or the CDN 140 may allow clients such as a vehicle computing system 120 (e.g., vehicle computing systems 120A-120D) to make requests for information and services. For example, a vehicle computing system 120 may make a request for HD map data for driving along a route and the online HD map system 110 and/or the CDN 140 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 2:
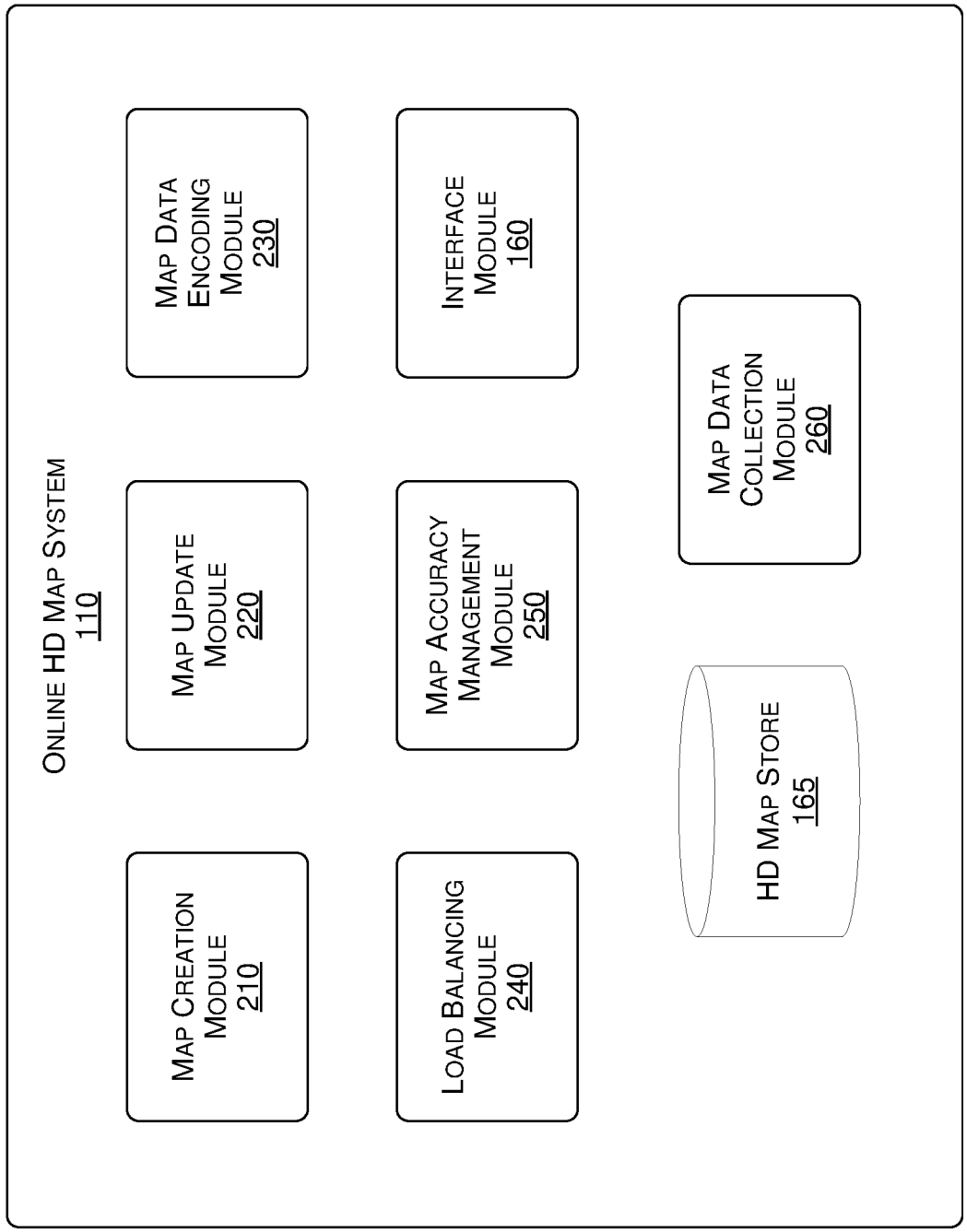
FIG. 2 illustrates an example system architecture of an online HD map system that may be included in the system environment of FIG. 1, in accordance with one or more embodiments of the present disclosure.

The online HD map system 110 may comprise an interface module 160 and an HD map store 165. The online HD map system 110 may be configured to include other modules than those illustrated in FIG. 1, for example, various other modules as illustrated in FIG. 2 and further described herein. The online HD map system 110 may be configured to interact with the CDN 140, one or more map creators or map sources, and/or the vehicle computing system 120 of various vehicles 150 using the interface module 160. The online HD map system 110 may be configured to store map information for one or more geographic areas in the HD map store 165. Portions of the map information in the HD map store 165 may be cached at edge servers of the CDN 140 via push and/or pull caching. Distributed caching of the map information within the CDN 140 may minimize or reduce latency in the distribution of the map information to the vehicles 150. For example, portions of the map information for a given geographic subregion may be cached at an edge server of the CDN 140 that is physically within, near, or close (e.g., closer than other edge servers of the CDN 140) to the given geographic subregion such that the map information for the given geographic subregion may be provided to a vehicle 150 driving in or near the given geographic subregion with less latency than if the map information is distributed from an edge server that is located outside or further away from the given geographic subregion.

In the present disclosure, a module, such as the interface module 160 or other modules herein, may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

Although not illustrated in FIG. 1, the online HD map system 110 may be configured to receive sensor data collected by sensors of two or more vehicles 150, for example, hundreds or thousands of cars. The sensor data may include any data that may be obtained by sensors of the vehicles 150 that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the area(s) in which the vehicles 150 may be driving. The online HD map system 110 may be configured to build high definition maps based on the collective sensor data 115 that may be received from the vehicles 150 and to store the HD map information in the HD map store 165. The foregoing describes one method to generate HD maps. More generally, the HD maps described herein may be generated using the foregoing and/or other suitable method(s).

The online HD map system 110 may divide one or more HD maps in the HD Map store 165 into smaller sections, or map tiles, which may be updated out of sync with neighbor map tiles. At least some portions of the HD maps, such as one or more of the map tiles, may be cached at edge servers of the CDN 140. Alternatively or additionally, and as described in more detail herein, each HD map may be stored as an immutable tree by storing nodes of the HD map (e.g., payloads of the various content of the map tiles) in a distributed hash table. The online HD map system 110 may implement path copying or other version preservation techniques such as copy-on-write, fat node, or combination of two or more of path copying, copy-on-write, or fat node to update the immutable tree. Payloads of the various content may be stored as BLOBs in an origin data plane and the BLOBs may be distributed to clients (e.g., vehicle computing systems 120) through the CDN 140. A tile compatibility matrix may be generated and published for each version of each map tile to the CDN 140 that identifies one or more versions of each neighbor map tile with which a given map tile is compatible.

The CDN 140 may be CLOUDFRONT from AWS or other suitable CDN. In an example, the CDN 140 is a pull-based CDN. Pull-based CDNs implement pull caching, e.g., they do not distribute content to a given edge server of the CDN until a client requests the content, e.g., while the client is in a region near to or including the given edge server. In comparison, push-based CDNs implement push caching, e.g., they pre-load content from one or more content servers, such as the online HD map system 110, to edge servers of the CDN before the content is requested by a client. The CDN 140 may implement one or more of the following features and/or other features: 1) a maximum time to live (TTL) for cached data, 2) security mechanisms such as cookie-based security or CLOUDFRONT's Lambda@Edge with signed JSON web tokens (JWT), or 3) CDN invalidations for latest updates (e.g., one to five minutes or other time period).

In some embodiments, when a particular vehicle 150 is scheduled to drive along a route, the particular vehicle computing system 120 of the particular vehicle 150 may be configured to provide information describing the route being travelled to the online HD map system 110 and/or the CDN 140. In response, the online HD map system 110 may be configured to provide HD map data 125 of HD maps related to the route (e.g., that represent the area that includes the route) that may facilitate navigation and driving along the route by the particular vehicle 150. Alternatively or additionally, when a particular vehicle 150 is driving along a route in a geographic subregion corresponding to a particular map tile, the particular vehicle 150 may read a corresponding tile compatibility matrix for the particular map tile and request a corresponding neighbor tile (identified from the tile compatibility matrix) along the route from the CDN 140, which may provide the requested neighbor tile to the particular vehicle 150.

In an embodiment, the online HD map system 110 and/or the CDN 140 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

The vehicle 150 may include vehicle sensors 105 (e.g., vehicle sensors 105A-D), vehicle controls 130 (e.g., vehicle controls 130A-130D), and a vehicle computing system 120 (e.g., vehicle computer systems 120A-120D). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150. Example implementations of vehicle sensors 105, vehicle computing systems 120, and vehicle controls 130 are described in more detail elsewhere herein, e.g., with respect to FIGS. 10A-10C.

Briefly, the vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc., such as one or more actuators. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110 and/or the CDN 140. For example, the vehicle computing system 120 may—based on sensor data, map data, and/or other data-determine one or more of a current location of the corresponding vehicle 150, a route to travel from the current location to a destination, one or more neighbor map tiles that are compatible with a map tile for a geographic area that includes the current location, what objects are around the corresponding vehicle 150, whether such objects are moving or are likely to move, details of the road on which the corresponding vehicle 150 is travelling, a plan including a sequence of actions to take within a short time interval, control signals that may be sent to the vehicle controls 130 to execute the plan, etc. The vehicle computing system 120 may also be configured to process data for sending to the online HD map system 110. The vehicle computing system 120 may also be configured to request one or more neighbor map tiles from the CDN 140.

In an embodiment, the vehicle computing system 120 may be configured to provide access to a spatial 3-dimensional (3D) representation of the road and various physical objects around the road as stored in, e.g., a local HD map store of the corresponding vehicle 150. The vehicle computing system 120 may be configured to determine navigable boundaries for one or more lane elements and/or obtain information describing occupancy for the surface of the road and all objects available in the HD map near the current location of the corresponding vehicle 150. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb.

The vehicle computing system 120 may include one or more application programming interfaces (APIs), such as an API for accessing and/or processing map information, e.g., in a local HD map store of the vehicle 150. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Accordingly, an API of the vehicle computing system 120 may include a vehicle manufacturer adapter with instructions specific to each of one or more vehicle manufacturers, a computer platform adapter with instructions specific to each of one or more computer platforms, and/or a common HD map API layer with generic instructions that may be used across two or more vehicle computer platforms and/or vehicle manufacturers.

The interactions between the vehicle computing systems 120 and the online HD map system 110 and/or the CDN 140 may be performed via a network, for example, via the Internet. The network may be configured to enable communications between the vehicle computing systems 120, the online HD map system 110, and/or the CDN 140. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of the links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

FIG. 2 illustrates an example system architecture of the online HD map system 110, according to one or more embodiments of the present disclosure. The online HD map system 110 may be configured to include a map creation module 210, a map update module 220, a map data encoding module 230, a load balancing module 240, a map accuracy management module 250, an interface module 160, a map data collection module 260, and an HD map store 165. Some embodiments of online HD map system 110 may be configured to include more or fewer modules than shown in FIG. 2. Functionality indicated as being performed by a particular module may be implemented by other modules. In some embodiments, the online HD map system 110 may be configured to be a distributed system comprising two or more processing systems.

The map creation module 210 may be configured to create the HD map data of HD maps from sensor data collected from several vehicles (e.g., 150A-150D) that are driving along various routes and/or from other sources. The map update module 220 may be configured to update previously computed HD map data by receiving more recent information (e.g., sensor data) from vehicles 150 that recently travelled along routes on which map information changed or from other sources. For example, certain road signs may have changed or lane information may have changed as a result of construction, and the map update module 220 may be configured to update the HD maps and corresponding HD map data accordingly. The map data encoding module 230 may be configured to encode HD map data to be able to store the data efficiently (e.g., compress the HD map data) as well as send the HD map data to vehicles 150. The load balancing module 240 may be configured to balance loads across vehicles 150 such that requests to receive data from vehicles 150 are distributed (e.g., uniformly distributed) across different vehicles 150 (e.g., the load distribution between different vehicles 150 is within a threshold amount of each other). The map accuracy management module 250 may be configured to maintain relatively high accuracy of the HD map data using various techniques even though the information received from individual vehicles may not have the same degree of accuracy.

In some embodiments, the map data collection module 260 may monitor vehicles 150 and process status updates from vehicles 150 to determine whether to request one or more certain vehicles 150 for additional data related to one or more particular locations.

Figure 3:
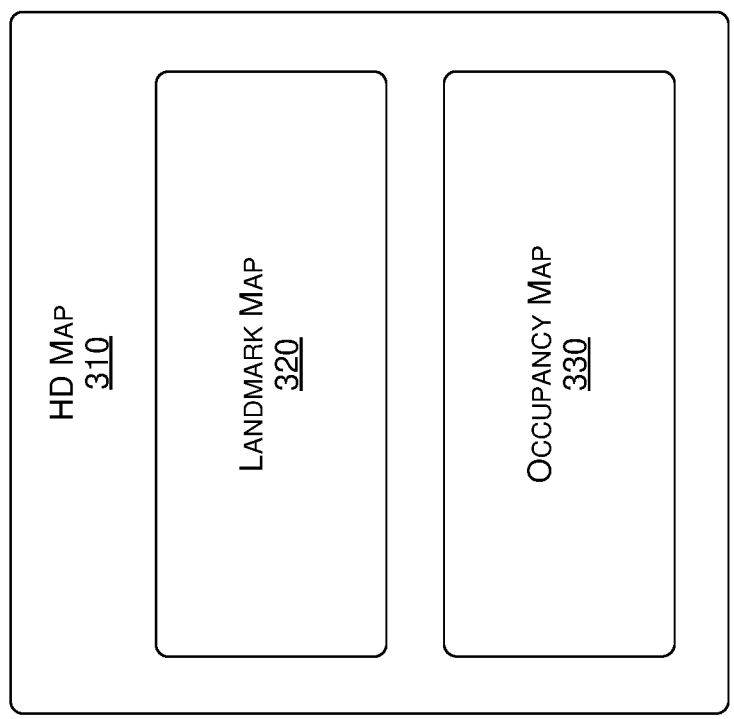
FIG. 3 illustrates example components of an HD map, in accordance with one or more embodiments of the present disclosure.

FIG. 3 illustrates example components of an HD map 310, according to one or more embodiments of the present disclosure. The HD map 310 may include HD map data of maps of one or more geographic areas. In the present disclosure, reference to a map or an HD map, such as HD map 310, may include reference to the map data that corresponds to such a map. Further, reference to information of a respective map may also include reference to the map data of that map.

In some embodiments, the HD map 310 of a geographic area may comprise a landmark map (LMap) 320 and an occupancy map (OMap) 330. Either or both of the landmark map 320 or the occupancy map 330 may be organized into smaller sections, such as map tiles.

The landmark map 320 may comprise information or representations of driving paths (e.g., lanes, yield lines, safely navigable space, driveways, unpaved roads, etc.), pedestrian paths (e.g., cross walks, sidewalks, etc.), and landmark objects (e.g., road signs, buildings, etc.). For example, the landmark map 320 may comprise information describing lanes including the spatial location of lanes and semantic information about each lane. The spatial location of a lane may comprise the geometric location in latitude, longitude, and elevation at high precision, for example, precision within 30 centimeters (cm) or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In some embodiments, the landmark map 320 may comprise information describing stop lines, yield lines, spatial location of crosswalks, safely navigable space, spatial location of speed bumps, curb, road signs comprising spatial location of all types of signage that is relevant to driving restrictions, etc. Examples of road signs described in an HD map 310 may include traffic signs, stop signs, traffic lights, speed limits, one-way, do-not-enter, yield (vehicle, pedestrian, animal), etc.

In some embodiments, the information included in a landmark map 320 can be associated with a confidence value measuring a probability of a representation being accurate. The vehicle computing system 120 may use the confidence value to control the vehicle 150. For example, if a representation of a landmark object is associated with a high confidence value in the landmark map 320 but the vehicle 150 does not detect the landmark object based on the vehicle sensors 105 and the corresponding observation of the environment around the vehicle 150, the vehicle computing system 120 can be configured to control the vehicle 150 to avoid the landmark object that is presumed to be present based on the high confidence value, or control the vehicle 150 to follow driving restrictions imposed by the landmark object (e.g., causes the vehicle 150 to yield based on a yield sign on the landmark map).

In some embodiments, the occupancy map 330 may comprise a spatial 3D representation of the road and physical objects around the road. The occupancy map 330 may also be referred to herein as an occupancy grid. Similarly, the data stored in an occupancy map 330 may also be referred to herein as occupancy grid data. The 3D representation of the road and physical objects around the road may be associated with a confidence score indicative of a likelihood of the object existing at the location. The occupancy map 330 may be represented in a number of other ways. In some embodiments, the occupancy map 330 may be represented as a 3D mesh geometry (collection of triangles) which may cover the surfaces. In some embodiments, the occupancy map 330 may be represented as a collection of 3D points which may cover the surfaces. In some embodiments, the occupancy map 330 may be represented using a 3D volumetric grid of cells at 5-10 cm resolution. Each cell may indicate whether or not a surface exists at that cell, and if the surface exists, a direction along which the surface may be oriented.

The occupancy map 330 may take a large amount of storage space compared to a landmark map 320. For example, data of 1 gigabyte (GB)/Mile may be used by an occupancy map 330, resulting in the map of the United States (including 4 million miles of road) occupying $4 \times 10^{15}$ bytes or 4 petabytes. Therefore the online HD map system 110 and the vehicle computing system 120 may be configured to use data compression techniques to store and transfer map data thereby reducing storage and transmission costs. Alternatively or additionally, the map data may be divided into map tiles where map tiles relevant to or within a threshold distance of a current location and/or route of the vehicle 150 are provided to and/or stored at the vehicle 150. Accordingly, the techniques disclosed herein may help improve the self-driving of autonomous vehicles by improving the efficiency of data storage and transmission with respect to self-driving operations and capabilities.

In some embodiments, the HD map 310 may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS and may convert the information to a route based on the HD map 310 or may convert the information such that it may be compatible for use on the HD map 310.

The online HD map system 110 may be configured to divide a large physical area into geographic subregions and to store a map tile of each geographic subregion. Each geographic subregion may represent a contiguous area (virtually) bounded by the perimeter of a geometric shape, for example, a rectangle or square. In some embodiments, the online HD map system 110 may be configured to divide a physical area into geographic subregions of substantially similar size independent of the amount of data included in or pointed to by the map tile of each geographic subregion. In some embodiments, the online HD map system 110 may divide a physical area into geographic subregions of different sizes, where the size of each geographic subregion may be determined based on the amount of information included in or pointed to by the map tile of the geographic subregion. In some embodiments, the online HD map system 110 may be configured to determine the size of a geographic subregion based on an estimate of an amount of information that may be used to store the various elements of the physical area in the corresponding map tile.

Figure 4A:
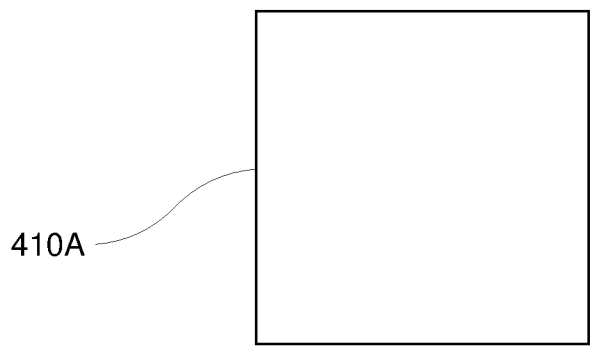
FIGS. 4A-4B illustrate example geographic subregions that can be defined in an HD map, in accordance with one or more embodiments of the present disclosure.
Figure 4B:
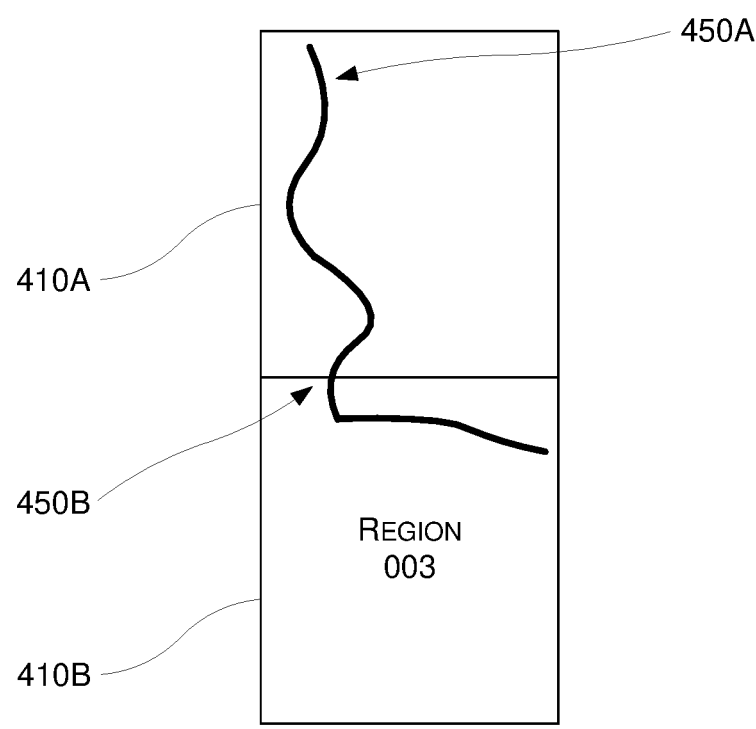

FIGS. 4A-4B illustrate example geographic subregions 410A and 410B that may be defined in an HD map and represented by map tiles, according to one or more embodiments of the present disclosure. FIG. 4A illustrates a square geographic subregion 410A. FIG. 4B illustrates two neighboring geographic subregions 410A and 410B. The online HD map system 110 may be configured to store data in a map tile of a geographic subregion that can allow for a smooth transition from one geographic subregion to another as a vehicle 150 drives across geographic subregion boundaries.

In some embodiments, the vehicle computing system 120 can be configured to switch the current map tile of a corresponding vehicle 150 from one map tile representing a current geographic subregion to a neighboring map tile representing a neighboring geographic subregion when the corresponding vehicle 150 crosses from the current geographic subregion to the neighboring geographic subregion or when the corresponding vehicle 150 crosses a predetermined (e.g., defined) threshold distance from the boundary. For example, as shown in FIG. 4B, the corresponding vehicle 150 starts at location 450A in the geographic subregion 410A. The corresponding vehicle 150 may traverse a route to reach a location 450B where it may cross the boundary between the geographic subregions 410A, 410B. The vehicle computing system 120 of the vehicle 150 may switch from the map tile representing the geographic subregion 450A to the map tile representing the geographic subregion 450B when the vehicle 150 crosses the boundary or when the vehicle 150 crosses a threshold distance past the boundary (e.g., to reduce or prevent rapid switching when the vehicle 150 travels a route that closely tracks the boundary).

According to at least one embodiment herein, map data may be delivered by the online HD map system 110 to vehicles 150 and/or other clients through a data plane, such as the CDN 140 of FIG. 1. Alternatively or additionally, the online HD map system 110 may combine an idiomatic file layout using manifests that is fronted by a CDN and consumed by a smart client (e.g., vehicles 150). In these and other embodiments, data may be indexed in such a way that writing a client is simple and does not involve a control plane, proxy, or a dynamic tile server.

Previous manifest designs may allow a client to download the complete index of a given version of an HD map. While this may provide the client a full map index for a given version of the HD map, the cost of such functionality may be a very large and unnecessary index tree transmission and traversal. Transmission and traversal of the complete index tree is unnecessary because clients typically only need a very sparse subset of the total HD map to accomplish their immediate task. Furthermore, such a manifest design may be overly complex to meet tight storage requirements from the client (e.g., vehicle 150), potentially involving splitting layers of the tree into sub-manifests to reduce file sizes, for example, or other complexities.

Rather than distributing the entire index, which may be prohibitive and complex, some embodiments herein instead pre-determine a common indexing system that clients can directly interact with. A given HD map may be modeled as a versioned graph with each node being a versioned tile along with its immediate neighbor edges. Such an arrangement may permit clients to pull down smaller amounts of data, such as only chunks of the manifest that they are directly interested in, and may eliminate deep index traversals while providing a flatter object graph structure. Further, such an arrangement may permit publishers to publish small manifest updates versus rebuilding the entire index.

One or more of the embodiments herein may be implemented using a tile store, tile manifest, and compatibility matrix. The tile store may be implemented as an object graph serialized into a BLOB store. One or more tiles, associated layers, and/or linked raw payload data for those layers may be stored in the tile store using corresponding immutable content hashes. Such a layout may be completely flat with an interface implemented as, e.g., a key value store of tile identifier to tile manifest. The tile store may be immutable, idempotent, and easily cacheable. Thus, after a tile is published it may exist forever. Alternatively or additionally, a garbage collection system may be implemented to prune old data.

Payload elements referenced by tile manifests may be served from the CDN 140 with or without communication with a control plane. Serving tile manifests without communication with the control plane may be reserved for any client not involved in development workflows. Tile manifests may be pre-built and served from the CDN 140 and may include $26364 \times 10^6$ manifests for level 16 tiles to cover, e.g., the entire US as the geographic area of a corresponding HD map. Client requests may be decomposed to level 16 tiles. Clients may construct URLs to construct the latest version for any tile. Some embodiments involve sequential fetching of adjacent tile manifests with compatibility guaranteed and/or parallel fetching of tile manifests with no compatibility guarantee. In comparison, communication with the control plan may be reserved for, e.g., internal development workflows.

FIG. 5A illustrates an example schema 500 defining the tile store as an object graph, according to one or more embodiments of the present disclosure. As illustrated, each tile manifest may identify one or more layers of a corresponding map tile and a geographic subregion represented using the corresponding map tile. Each tile manifest may include, for each layer, a name of the layer, a hash of a layer manifest of the layer, and a uniform resource locator (URL) or other pointer to a payload of the layer manifest. Each layer may include one or more items, or segments, and may be managed by the corresponding layer manifest. As further illustrated, each layer manifest may identify the one or more items of the corresponding layer and may include for each item a unique identifier (ID) of the item, a hash of a payload of the item, and a URL or other pointer to the payload of the item.

The content at each of the URLs or other pointers may be hosted on an origin data plane, such as the online HD map system 110, and may be distributed through a CDN, such as the CDN 140. FIG. 5B illustrates an example schema 510 of an origin data plane storage, according to one or more embodiments of the present disclosure.

Figure 6:
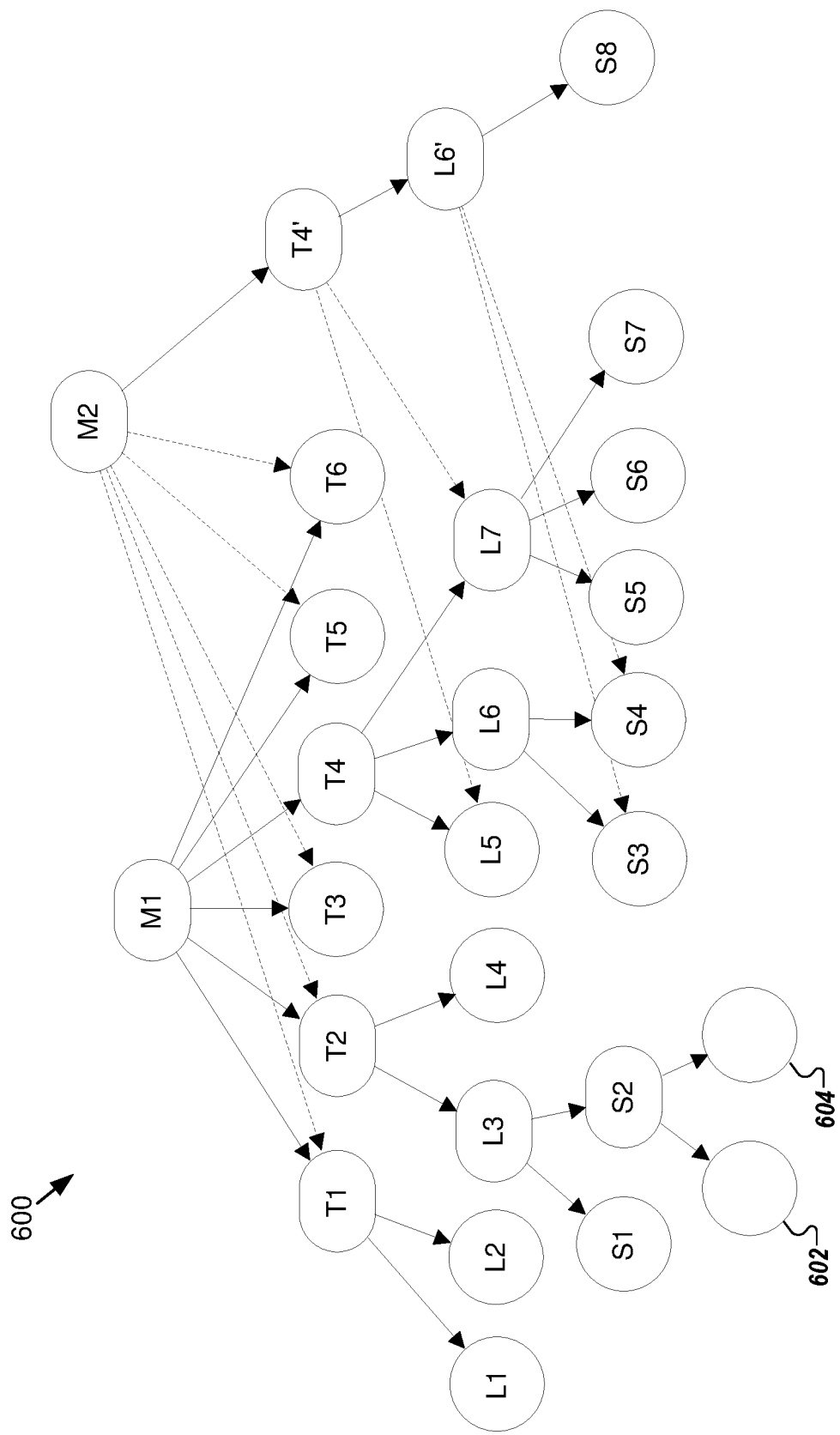
FIG. 6 is a graphical representation of a tile store as an immutable tree object graph, according to one or more embodiments of the present disclosure.

FIG. 6 is a graphical representation of a tile store 600 using an immutable tree object graph, according to one or more embodiments of the present disclosure. The tile store 600 may be, include, or be included in an HD map, such as the HD maps discussed elsewhere herein. The tile store 600 generally includes various nodes M, T, L, S representing or corresponding to one or more HD maps and/or one or more versions of an HD map. For example, the M1 node represents a first version of an HD map and the M2 node represents a second version of the HD map. The T1, T2, T3, T4, T5, and T6 nodes represent different tiles, e.g., in the M1 version of the HD map, and the T4 and T4' nodes represent different versions of the same tile in different versions M1, M2 of the HD map. The L1, L2, L3, L4, L5, L6, and L7 nodes represent different layers, e.g., in the M1 version of the HD map, and the L6 and L6' nodes represent different versions of the same layer in different versions M1, M2 of the HD map. The S1, S2, S3, S4, S5, S6, S7 nodes represent different segments, e.g., in the M1 version of the map while the S8 node represents a new segment in the M2 version of the HD map. FIG. 6 further illustrates two unlabeled nodes

602, 604 that may represent different portions of the segment represented by the S2 node, for instance.

Some embodiments utilize path copying for versioning of HD maps. In path copying, all nodes are copied on the path to any node that is changed and pointers of the copied nodes are updated to point to the copies and/or the changed node. For example, suppose the segment represented by the node S8 is added to the layer represented by the node L6. In this example, the node L6 which points only to the nodes S3 and S4 is changed to the node L6' which points to the nodes S3, S4, and S8. In addition, all nodes in the path to the node L6, including the nodes T4 and M1, are copied. The copied nodes are shown as the nodes T4' and M2 in FIG. 6. The node T4' (i.e., the copy of the node T4) maintains its pointers to the nodes L5 and L7 and is updated to point to the node L6' instead of the node L6. Similarly, the node M2 (i.e., the copy of the node M1) maintains its pointers to the nodes T1, T2, T3, T5, and T6 and is updated to point to the node T4' instead of the node T4.

In an embodiment, a geographic area covered by a given HD map may be or include one or more: towns, cities, counties, state parks, national parks, states, geographic areas (e.g., the Great Basin, the Appalachian Mountains, the Mississippi River watershed), countries, continents, planets (e.g., Earth) and/or other geographic areas. In some embodiments, there may be more than one HD map of a given geographic area, such as a general HD map of the given geographic area, a synthetic map of the given geographic area, a customer-specific HD map of the given geographic area, a data model-specific HD map, and/or other HD maps of the given geographic area. Different HD maps of the same geographic area may be managed with a namespace mapping that may be passed along during a merge operation for, e.g., a geographic area that is the world in this example: "merge(manifest, world)". The manifest may include or identify a collection of tiles that collectively form a given one of the HD maps of the world (or other geographic area). The merge operation may perform one or more of the following: 1) Confirm the supplied tiles are valid and have all their data uploaded to the tile store, 2) Verify that tile updates are consistent with their surrounding tiles, 3) Publish a tile compatibility matrix at all associated versioned indexing locations, 4) Publish the tile compatibility matrix at the latest index locations, and/or 5) Send cache invalidations to clients (e.g., vehicles 150) to aggressively promote new data.

Some embodiments therefore generate and serve the tile compatibility matrix, which may be served at one or both of the following example endpoints (in the example in which the geographic area is the world): 1) "$cdn/$world/tile/$x/$y"—for a latest tile compatibility matrix and 2) "$cdn/$world/tile/$version"—for a versioned tile compatibility matrix.

The resulting manifest may have encoded therein an n×n tile compatibility matrix, including the requested tile in the center of the tile compatibility matrix along with the neighbors surrounding it. In some embodiments, the n×n tile compatibility matrix is a 3×3 tile compatibility matrix. Alternatively, the tile compatibility matrix may include fewer than all of the requested tile's neighbors (e.g., eight neighbors in the example of a 3×3 matrix), such as only those neighbor tiles to the immediate north, west, south, and east of the requested tile. Each entry in the tile compatibility matrix may include a tuple of, e.g., (hash, tile manifest, URL). Alternatively or additionally, other data may be included in one or more entries of the tile compatibility matrix. In some embodiments, the entries in the tile compatibility matrix omit the tile manifests of the tiles and instead include pointers to manifest versions including the neighbor tiles that are all consistent. Such a lightweight tile compatibility matrix may enable clients to find a valid path by simply asking for a corresponding tile compatibility matrix and then following the returned versions for the neighboring links. The use of such tile compatibility matrices may enable one or more of the following: 1) tile updates may be non-local on different publishing schedules, 2) the entire HD map (e.g., for the world or other geographic area) does not have to be versioned together; instead, immediate tile neighbors may be versioned together, 3) if no previous tile is being driven on, then any current tile version may be a valid starting point, and 4) while driving, the next tile may always be consistent with the tile to which the vehicle 150 is localized to.

One or more of the foregoing may be achieved atomically and consistently by a given tile compatibility matrix pointing to all its consistent neighbors at a given version. A new tile version may be published atomically with pointers towards existing data without affecting existing clients, e.g., by writing to a versioned index first. Since no client knows or is aware yet of the names of the new tile versions, they can be published in any order. This is akin to putting a new book (e.g., as a representation of the new tile version) on the shelf of a library (e.g., as a representation of the HD map) without updating the card catalog (e.g., as a representation of a latest index).

Next, back pointers from the neighboring tiles can be published in an eventually consistent manner as either the old or new tile will be consistent and thus safe to use. Continuing with the library example, this is akin to updating a book (e.g., as a representation of a neighboring tile) in the library to add a citation (e.g., as a representation of a back pointer) to the new book (e.g., as a representation of the new tile version). If someone is reading that book and sees the new citation, they may use it or a previous citation (e.g., as a representation of an old back pointer to an old version of the new tile version).

Finally, the latest index is updated with the new tiles in an eventually consistent manner as these tiles will only point towards versioned resources that already exist, so a path broken by a missing tile cannot exist. Continuing with the library example, this is akin to updating the card catalog (e.g., as a representation of the latest index) so new readers can find the newly published book.

If the back pointers were updated in a fully versioned manner then all the tiles would need to be updated in a cascading fashion. In the library example this would mean an update to a citation would mean every book would eventually need a new version published and updated in the card catalog. To avoid updating all tiles, some embodiments may update back pointers in place (like references verses values) without needing to create a new versioned entry as long as the tile edge data is still consistent and has not changed. These updates may be delivered as soon as the changes can propagate to the CDN edges. An example of the foregoing is illustrated below.

Figure 7:
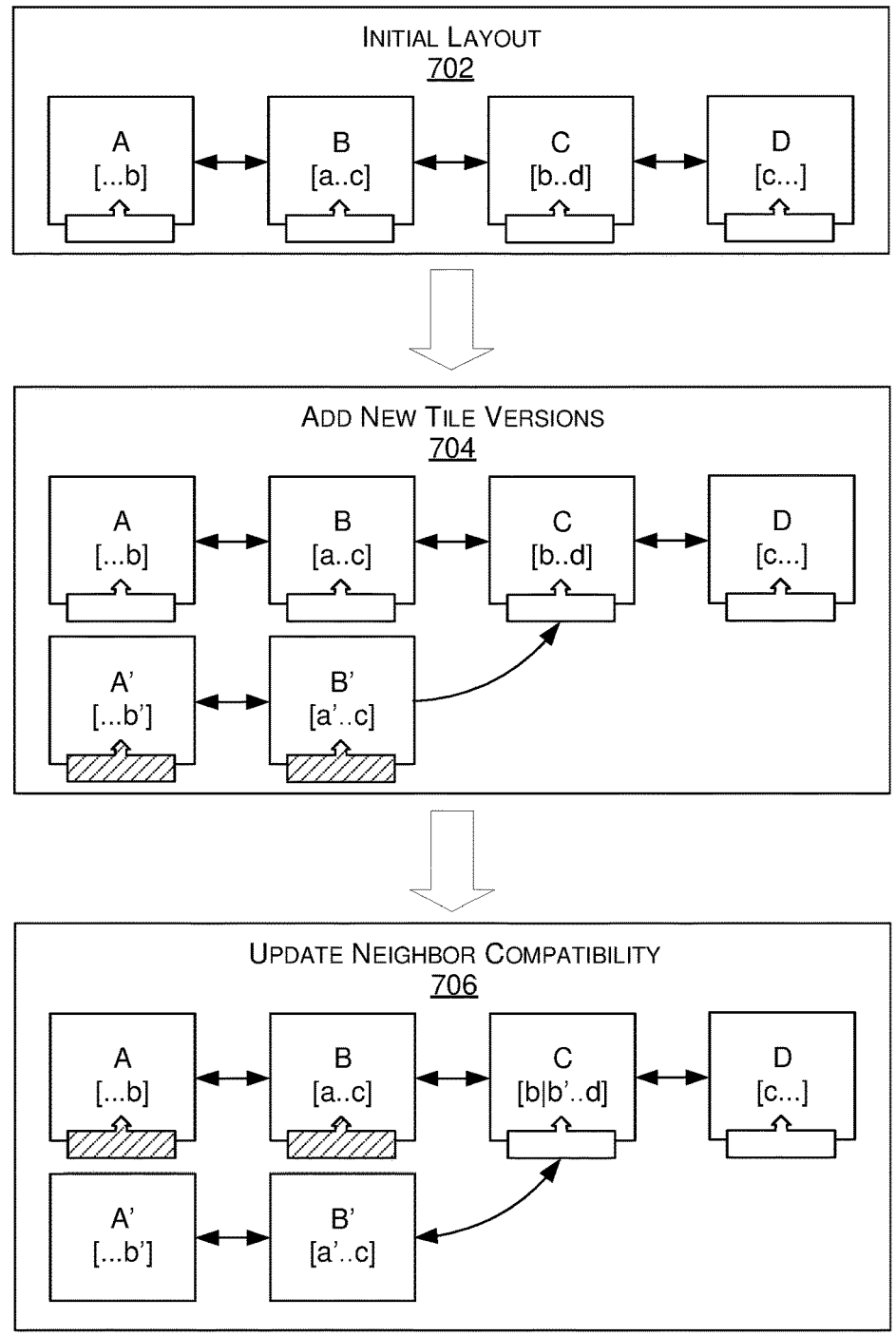
FIG. 7 illustrates an example tile update method, according to one or more embodiments of the present disclosure.

FIG. 7 illustrates an example tile update method 700, according to one or more embodiments of the present disclosure. The method 700 generally includes adding one or more new tiles to a versioned index, creating back pointers in the new tiles to existing data (e.g., pre-existing tiles and/or new tiles), adding back pointers in existing tiles to the new tiles, and updating the versioned index to identify the latest versions of tiles.

In more detail, block 702 illustrates an example initial layout of a versioned tile index that includes sequential tiles A, B, C, and D. The tiles A-D may represent sequential geographic subregions along a route or path. Each of the tiles A-D includes a back pointer to a corresponding neighbor tile in one or both directions. For example, the tile A includes a back pointer "b" to the tile B, the Tile B includes a back pointer "a" to the tile A and a back pointer "c" to the tile C, the Tile C includes a back pointer "b" to the tile B and a back pointer "d" to the tile D, and the tile D includes a back pointer "c" to the tile C. The versioned index is shown in simplified form where each tile A-D includes one or two back pointers to one or two corresponding neighbors; more generally, however, each tile in the versioned index may include one or more (up to eight in some embodiments) back pointers to one or more (up to eight in some embodiments) neighbor tiles.

Block 704 illustrates the addition of new tile versions to the versioned index. In particular, a new tile A' is published in the versioned index as a new version of the tile A while a new tile B' is published in the versioned index as a new version of the tile B. After the addition of new tiles to the versioned index, back pointers to existing data (e.g., a new tile or a pre-existing tile) may be added to each of the new tiles. For instance, a back pointer "b" to the tile B' may be added to the tile A' while a back pointer "a'" to the tile A' may be added to the tile B'.

Block 706 illustrates the updating of back pointers in place and the updating of the latest index. In more detail, pre-existing tiles with back pointers to old tiles that have been updated to new tiles have the back pointers updated in place to point to the new tiles. In the example of FIG. 7, the tile C is the only pre-existing tile with a back pointer to one of the new tiles, e.g., to new tile B', so in the tile C the back pointer b of to the tile B is updated in place as back pointer b' to the new tile B'.

The latest index is then updated to include the new tiles A' and B' in place of the old tiles A and B. In FIG. 7, tiles in the latest index, e.g., the latest validated version of each tile, are denoted by arrow boxes with no fill pattern. Tiles that are not in the latest index, e.g., because they have not been validated and/or they are an older version of a validated tile, are denoted in FIG. 7 by arrow boxes with a cross-hatch fill pattern. Thus, it can be seen in the example of FIG. 7 that the new tiles A' and B' are added to the latest index after being validated. New tiles may be considered validated when back pointers of any pre-existing tiles that pointed to the old tiles have been updated to point to the new tiles, among potentially other criteria.

Some embodiments permit historical paths to be followed, where a historical path includes a path via consistent versions of old tiles that are no longer in the latest index. Historical paths may be followed for legacy debugging or other purposes. The ability to follow historical paths may be preserved by appending a versioned entry to a vector of back pointers when updating back pointers, rather than overwriting old back pointers. FIG. 8 illustrates an example schema 800 of a tile compatibility matrix that may be implemented to follow historical paths, according to one or more embodiments of the present disclosure.

In view of the foregoing, some embodiments herein may support one or more of the following: 1) any node entry that exists is valid and consistent, 2) following the first node will present the latest tile version path, 3) following the last node will present the oldest tile version path, and (4) to follow a path at a given time, simply choose the first node version less than the given time. In these and other embodiments, valid node options may be encoded during time periods in which compatibility to neighbors has not been affected. Alternatively or additionally, tiles may not encode neighboring versions for all of time to ensure the node version list remains small while also leaving the complete history available. To achieve the foregoing, a traversal may be started with a previous version of a tile. If the previous version list has become too large, a new tile compatibility matrix can simply be created that drops the oldest entries.

Downloading just the tile compatibility matrix offline may present a small challenge. Downloading serially may be trivial; simply start at any node and follow the graph edges to the eventual destination. Downloading in parallel may be harder. There may be two options. First, two or more paths may be followed at once, such as the start and end of the same path, with a meeting point somewhere in the middle. Second, the latest tiles covering the driving path may be downloaded in parallel. As this download is not guaranteed to be consistent, a dependency closure may be performed in a second pass to ensure a consistent path has been found (e.g., in case an update was gathered during the download). However, where map data is actually being downloaded, following these links may be trivially pipelined into the requests to download much larger amounts of map content.

The underlying tile indexing scheme may be a web Mercator projection sliced into a uniform grid or other tile indexing scheme. The web Mercator projection is the same model used by many two-dimensional (2D) maps, such as BING Maps, GOOGLE Maps, and OPENSTREETMAP. Different tile indexing schemes exist that may be implemented herein and that may make different tradeoffs. For example, UBER H3 does not project the map and instead applies hexagonal tiles. GOOGLE S2 reorganizes the world into a Hamiltonian path. Geohashing encodes indexes into a unique identifier.

Over time, previous HD map content may eventually become stale and disconnected from a current view of the geographic area corresponding to the HD map. After development tasks associated with previous HD map content are complete (e.g., debugging, analysis, investigations, auditing, etc.), the previous HD map content may no longer be relevant or needed. Insofar as some embodiments herein implement an immutable versioned graph, deleting old data, e.g., previous HD map content, may be difficult, but not impossible. The collection and/or deletion of previous HD map content or old data may be referred to as garbage collection.

In some embodiments, garbage collection may involve timed aging of HD map content from hot storage to warm storage and eventually cold storage. Cold storage may simply be forgotten (e.g., unlinked from the filesystem) after meeting an applicable data retention policy, if any. This solution may rely on having a time threshold for data validity and a constant flow of new data to rebuild the HD map with. Alternatively or additionally, garbage collection may involve following all active roots, collecting all active content into an active set, and taking the difference of this with the entire store (or any other more or less sophisticated garbage collection scheme). Non-active objects may then be removed. This solution may be run in batch from time to time using a suitable big data pipeline. Alternatively or additionally, garbage collection may involve keeping a tracking index of active content per tile. After a new tile is published, a cleanup task may be triggered for objects associated with the oldest version of this tile. This solution may be managed in the tile store itself and published with tile updates.

Payload elements referenced by tile manifests may be served from the CDN 140 with or without communication with the control plane. Serving tile manifests without communication with the control plane may be reserved for any client not involved in development workflows. Tile manifests may be pre-built and served from the CDN 140 and may include $26364 \times 10^6$ manifests for level 16 tiles to cover, e.g., the entire US as the geographic area of a corresponding HD map. Client requests may be decomposed to level 16 tiles. Clients may construct URLs to construct the latest version for any tile. Some embodiments involve sequential fetching of adjacent tile manifests with compatibility guaranteed and/or parallel fetching of tile manifests with no compatibility guarantee. In comparison, communication with the control plan may be reserved for, e.g., internal development workflows.

Some embodiments implement a cloud mapping utility as a tool that encapsulates logic for working with maps. The cloud mapping utility may be implemented on the online HD map system 110 or other computing system. The cloud mapping utility may be implemented instead of a service because the HD maps may be quite large and not well suited for passing around as inputs to service methods. Tile operations may be defined in the cloud mapping utility under a corresponding command. The command may give a directory of map data and the corresponding splitting strategy. The splitting strategy may be the web Mercator projection or other suitable strategy. The cloud mapping utility may be extensible enough to tile on various features in the event the splitting strategy is changed. The cloud mapping utility may be configured to convert a download from and upload to the corresponding splitting strategy. In some embodiments, one or more entities apart from the online HD map system may build tiles locally but only the online HD map system may be permitted to push tiles.

The cloud mapping utility may contain code to push to latest. Push to latest may do one or more of the following. Push to latest may ensure that existing data that is pointed to is uploaded, including uploading the data if it has not already been uploaded. Push to latest may push versioned manifests to the tiles and compatibility matrix. Push to latest may push the latest updates to the latest compatibility matrix. Push to latest may issue cache invalidations for latest manifests.

A mend operation may be the inverse of a tile operation. Given a directory of some number of tiles, the mend operation may convert them back to a single legacy map without tiles. The mend operation may be useful for when developers pull down portions of a map that cover many tiles and would like to directly feed that data into a mapping workflow or development tool. The mend operation may be implemented at the online HD map system or other computing system.

Some embodiments may implement a publish operation, e.g., at the online HD map system 110 or other computing system. The publish operation may be idempotent, protected by a geolock, and/or may involve one or more of the following. The publish operation may publish tile hashed BLOB data idempotently to the CDN and/or verify the correctness of the corresponding HD map with a synthetic remote manifest. The publish operation may create corresponding tile manifests and push those idempotently to the versioned CDN. The publish operation may create tile compatibility matrices and push those idempotently to the versioned CDN. The publish operation may check the geolock to see that the region being published is still owned. The publish operation may update tile compatibility matrix back pointer manifests and push those to the CDN. The publish operation may push the created tile compatibility matrix values to latest. The publish operation may invalidate latest updated compatibility manifests of the CDN. After a successful publish, the publish operation may release the geolock or retry the whole operation if any failure. After the geolock is removed, pending work to be started may begin (e.g., starting with a pull from latest for a requested area). The geolock may be a service implemented at the online HD map system 110 or other computing system to ensure mutual exclusion on some geographic geometry (e.g., WSG84).

FIG. 9 is a flow diagram showing a method 900 to manage map data, according to one or more embodiments of the present disclosure. Each block of the method 900 and/or other methods described herein comprises a computing process that may be performed using (or whose performance may be controlled by) any combination of hardware, firmware, and/or software. For instance, various functions may be carried out or controlled by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In some implementations, the method 900 and/or other methods described herein are stored on, carried out by, and/or controlled by an online HD map system or other computing system, such as the online HD map system 110 described elsewhere herein. In some implementations, the method 900 and/or other methods described herein may be stored on, carried out by, and/or controlled by one or more of: a control system for an autonomous or semi-autonomous machine, a perception system for an autonomous or semi-autonomous machine, a system for performing simulation operations, a system for performing deep learning operations, a system for generating synthetic data, a system for generating multi-dimensional assets using a collaborative content platform, a system implemented using an edge device, a system implemented using a robot, a system incorporating one or more virtual machines (VMs), a system implemented at least partially in a data center, or a system implemented at least partially using cloud computing resources.

The method 900, at block 902, includes storing a map of a geographic area as an immutable tree that includes a plurality of nodes stored in a distributed hash table. The nodes may include a plurality of map tiles that each covers a different geographic subregion of the geographic area of the map. FIG. 6 illustrates an example of such an immutable tree.

The method 900, at block 904, includes hosting one or more BLOBs that correspond to or make up the map tiles in an origin data plane. In some embodiments, hosting BLOBs that correspond to the map tiles in the origin data plan may include hosting the BLOBs in the online HD map system 110 of FIG. 1 or one or more central servers of a CDN.

The method 900, at block 906, includes distributing the BLOBs to client devices through a CDN. In some embodiments, distributing the BLOBs to client devices through the CDN includes distributing the BLOBs through the CDN 140 of FIG. 1

In some implementations, the method 900 may further include generating and storing a tile manifest for at least one of the map tiles. Each tile manifest may include an index of content of the corresponding map tile and an identification of a corresponding geographic subregion of the area of the map covered by the map tile. An example tile manifest schema such as may be implemented in the method 900 is illustrated in FIG. 5A. The index of content of each tile manifest may include one or more pointers to the content, and at least one pointer of the one or more pointers may include a hash of a corresponding BLOB included in the content.

Alternatively or additionally, the method 900 may further include generating a tile compatibility matrix that identifies for a given map tile one or more versions of one or more neighbor map tiles that are consistent with the given map tile. An example tile compatibility matrix schema such as may be implemented in the method 900 is illustrated in FIG. 8. The method 900 may further include receiving a request from a client device for the tile compatibility matrix. The method 900 may further include, in response to receiving the request, sending the tile compatibility matrix to the client device. In an example, the tile compatibility matrix includes a 3×3 matrix. A middle entry of the 3×3 matrix may corresponds to the given map tile. Each surrounding entry of the 3×3 matrix may correspond to a different neighbor map tile of the given map tile. For example, the surrounding entries of the 3×3 matrix may include the four neighbor tiles immediately to the north, south, east, and west of the given map tile and/or the four neighbor tiles immediately to the northwest, northeast, southwest, and southeast of the given map tile. Each entry in the 3×3 matrix may include a tuple of a hash of the corresponding map tile, one or more pointers to one or more tile manifest versions of each neighbor map tile that is consistent with the corresponding map tile, and a pointer to content (e.g., payload) of the corresponding map tile.

Alternatively or additionally, the method 900 may further include publishing a new version of a first map tile without rebuilding the map in its entirety. Publishing the new version of the first map tile may include publishing one or more updated BLOBs that correspond to the new version of the first map tile to the CDN, such as to a versioned tile index on the CDN. Publishing the new version of the first map tile may include generating a new version of a tile manifest for the new version of the first map tile. Publishing the new version of the first map tile may include pushing the new version of the tile manifest to the CDN. Publishing the new version of the first map tile may include generating a new version of a tile compatibility matrix for the new version of the first map tile, the new version of the tile compatibility matrix identifying for the new version of the first map tile one or more versions of one or more neighbor map tiles with which the new version of the first map tile is consistent. Publishing the new version of the first map tile may include pushing the new version of the tile compatibility matrix to the CDN. Publishing the new version of the first map tile may include updating one or more tile manifests of the one more neighbor map tiles to each include a back pointer to the new version of the first map tile.

As another example, publishing the new version of the first map tile may include adding the new version of the first map tile to a versioned index. Publishing the new version of the first map tile may include adding a back pointer in the new version of the first map tile from the new version of the first map tile to a current version of another map tile. A prior version of the first map tile may include a back pointer from the prior version of the first map tile to the current version of the other map tile. Publishing the new version of the first map tile may include adding a back pointer in the current version of the other map tile from the current version of the other map tile to the new version of the first map tile. Publishing the new version of the first map tile may include updating the versioned index to identify the new version of the first map tile as a latest version of the first map tile. Adding the back pointer in the current version of the other map tile from the current version of the other map tile to the new version of the first map tile may include appending the back pointer from the current version of the other map tile to the new version of the first map tile as a versioned entry to a vector of back pointers. Each entry in the vector of back pointers may point to a different version of the first map tile. In this and other examples, the method 900 may further include following a historical path that includes the prior version of the first map tile based on an entry in the vector of back pointers that points to the prior version of the first map tile and precedes the entry in the vector of back pointers that points to the new version of the first map tile. An example of some or all of the foregoing is illustrated and described with respect to FIG. 7.

Alternatively or additionally, the method 900 may further include implementing path copying to preserve one or more prior versions of the immutable tree when the immutable tree is updated. An example of such path copying is illustrated and described with respect to FIG. 6.

Figure 10A:
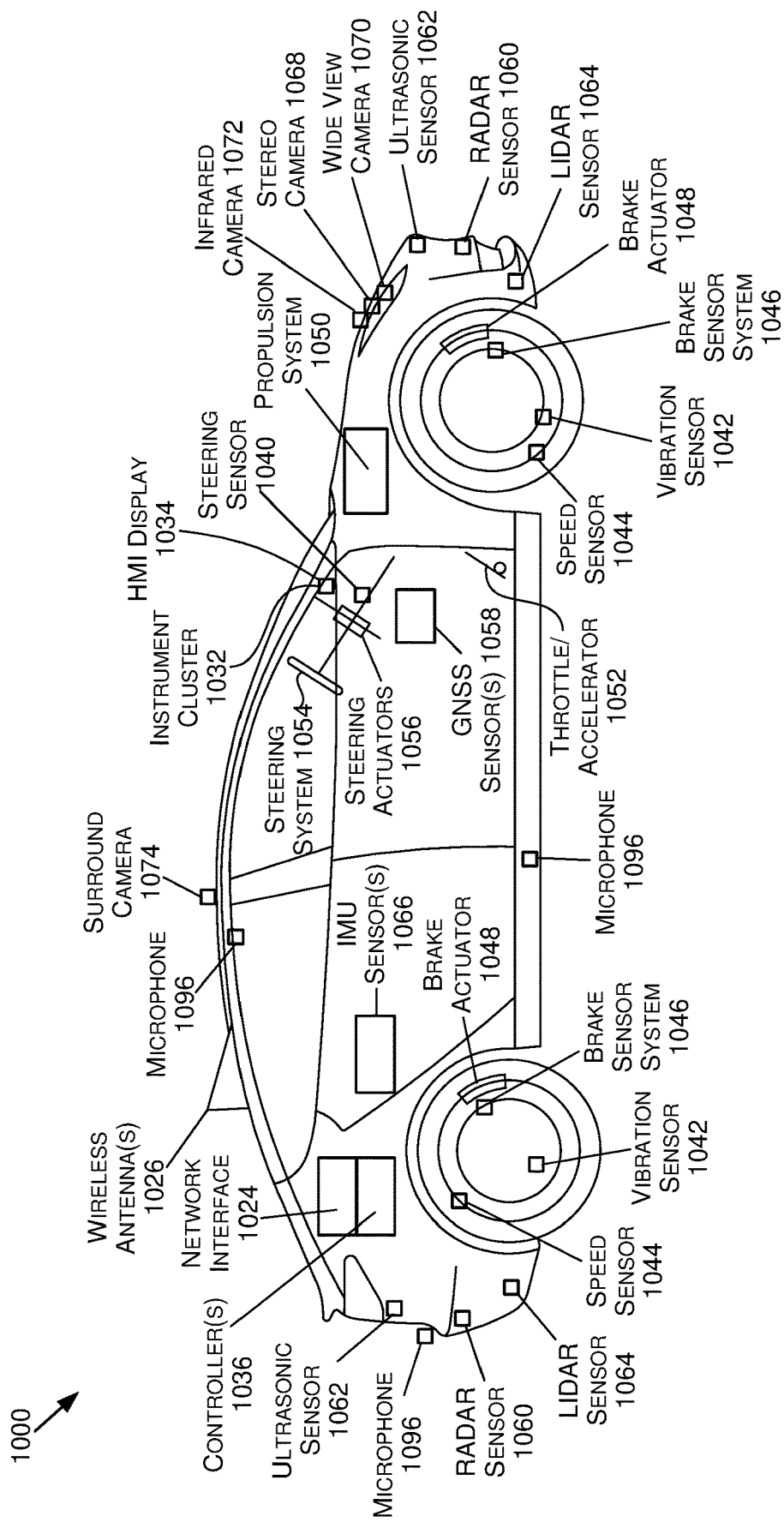
FIG. 10A is an illustration of an example autonomous vehicle, according to one or more embodiments of the present disclosure.

FIG. 10A is an illustration of an example autonomous vehicle 1000, according to one or more embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. For example, the vehicle 1000 may be capable of conditional automation (Level 3), high automation (Level 4), and/or full automation (Level 5), depending on the embodiment.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more CPU(s), system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, and/or to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) 1046 (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the HD map 1022 of FIG. 10C), location data (e.g., the location of the vehicle 1000, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024, which may use one or more wireless antenna(s) 1026 and/or modem(s) to communicate over one or more networks. For example, the network interface 1024 may be capable of communication over LTE, WCDMA, UMTS, GSM, CDMA2000, etc. The wireless antenna(s) 1026 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 10B:
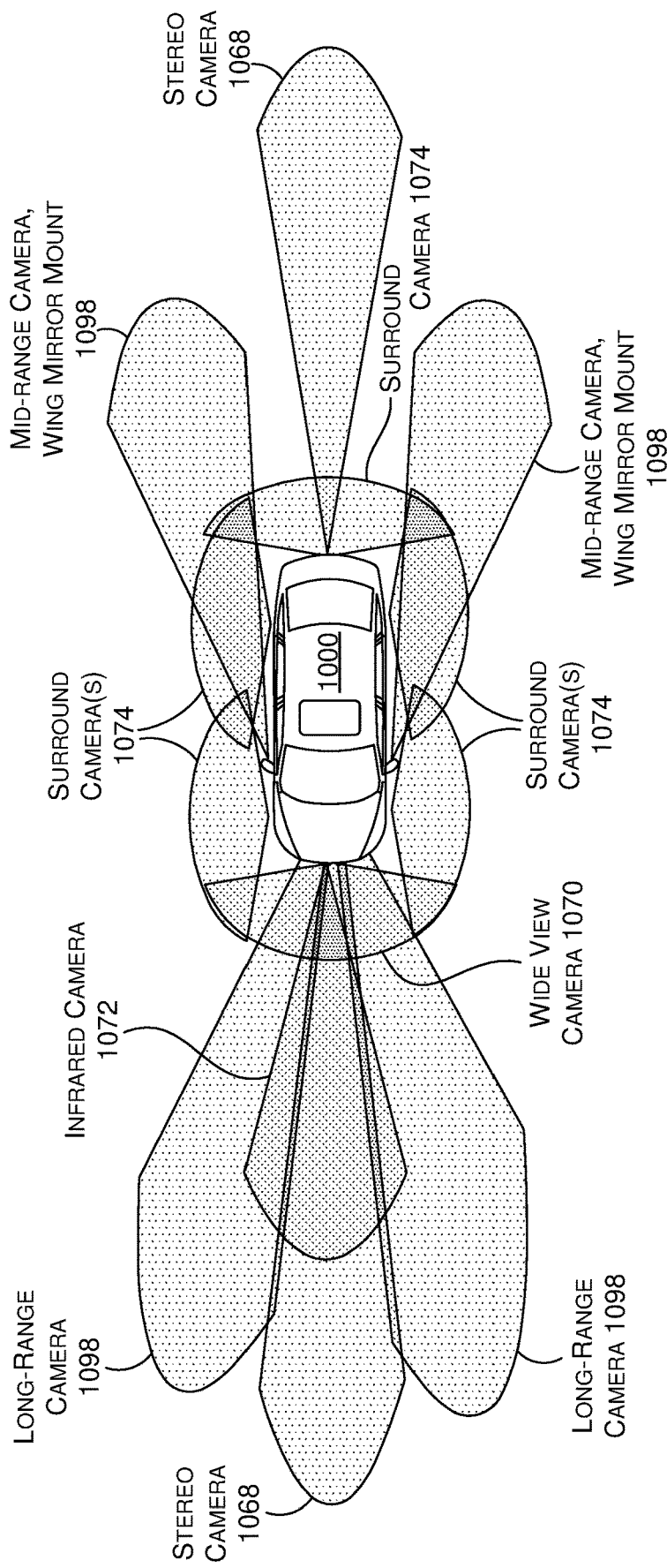
FIG. 10B is an example of camera locations and fields of view for the example autonomous vehicle of FIG. 10A, according to one or more embodiments of the present disclosure.

FIG. 10B is an example of camera locations and fields of view for the example autonomous vehicle 1000 of FIG. 10A, according to one or more embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 1000 (e.g., front-facing cameras) may be used for surround view, to help identify forward-facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may any number of wide-view cameras 1070 on the vehicle 1000. In addition, long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

One or more stereo cameras 1068 may also be included in a front-facing configuration. The stereo camera(s) 1068 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that includes portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned around the vehicle 1000. The surround camera(s) 1074 may include wide-view camera(s) 1070, fisheye camera(s), 360-degree camera(s), and/or the like. For example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround-view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Figure 10C:
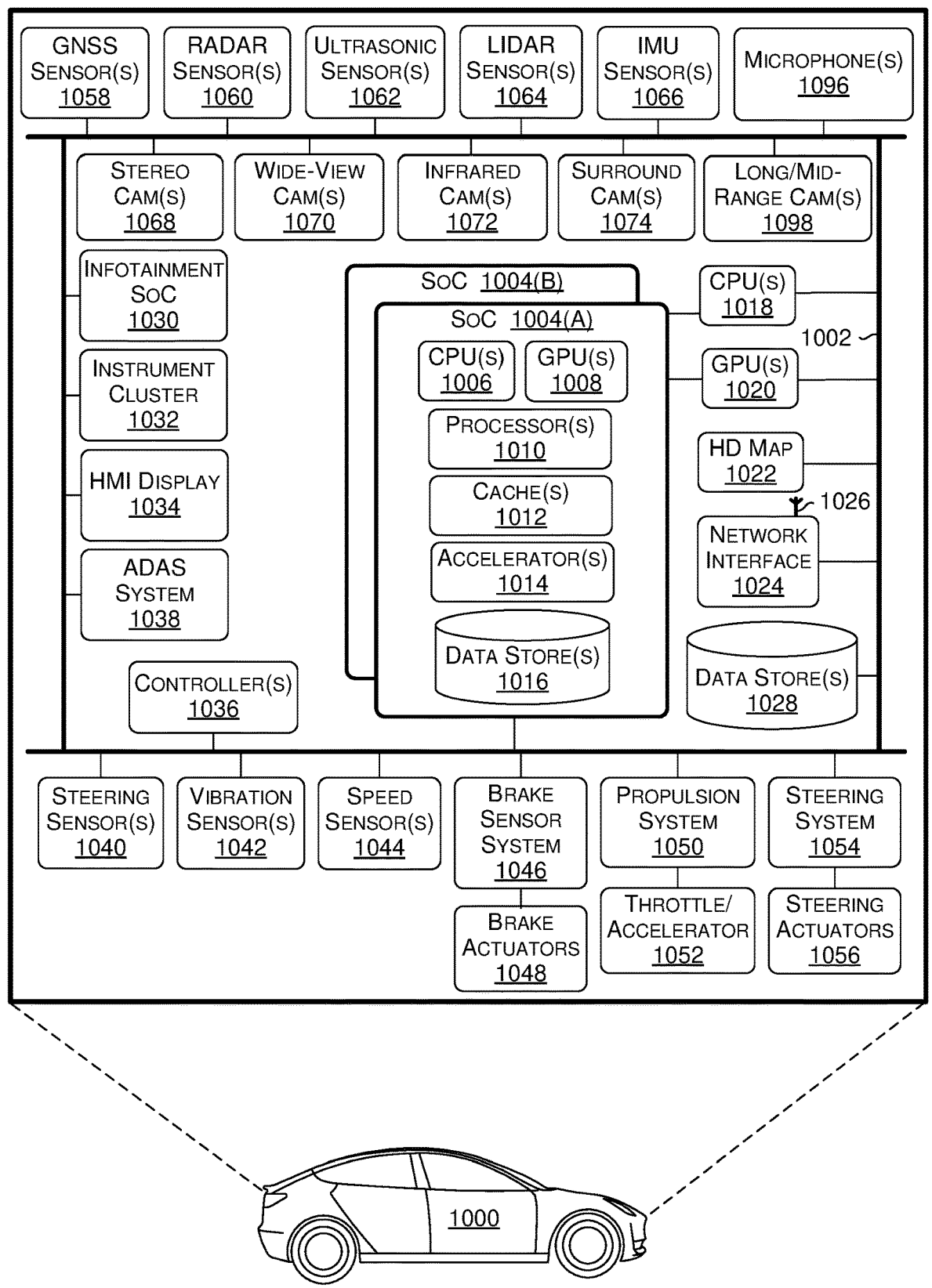
FIG. 10C is a block diagram of an example system architecture for the example autonomous vehicle of FIG. 10A, according to one or more embodiments of the present disclosure.

FIG. 10C is a block diagram of an example system architecture for the example autonomous vehicle 1000 of FIG. 10A, according to one or more embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C is illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000 and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use computer-based application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting, and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected to both the CPU(s) 1006 and the GPU(s) 1008). The cache(s) 1012 may include a write-back cache that may keep track of states of lines, such as by using a cache coherence protocol (e.g., MEL, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1016 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe-stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and actively performing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always-on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, which use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include an SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028, which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058 (e.g., GPS and/or assisted GPS sensors), to assist in mapping, perception, occupancy grid generation, and/or path planning functions. Any number of GNSS sensor(s) 1058 may be used, including, for example and without limitation, a GPS using a USB connector with an Ethernet to serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data, in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 1000 at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 100 m, with an accuracy of 2 cm-3 cm, and with support for a 100 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include an SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjusts the vehicle speed to maintain a safe distance from vehicles ahead. Lateral ACC performs distance keeping, and advises the vehicle 1000 to change lanes when necessary. Lateral ACC is related to other ADAS applications such as LC and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 1000), while the I2V communication concept provides information about traffic farther ahead. CACC systems may include either or both I2V and V2V information sources. Given the information of the vehicles ahead of the vehicle 1000, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network that is trained and thus reduces the risk of false positives, as described herein.

The vehicle 1000 may further include the infotainment SoC 1030 (e.g., an in-vehicle infotainment system (IVI)). Although illustrated and described as an SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 1000. For example, the infotainment SoC 1030 may include radios, disk players, navigation systems, video players, USB and Bluetooth connectivity, carputers, in-car entertainment, Wi-Fi, steering wheel audio controls, hands-free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe-stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

Figure 10D:
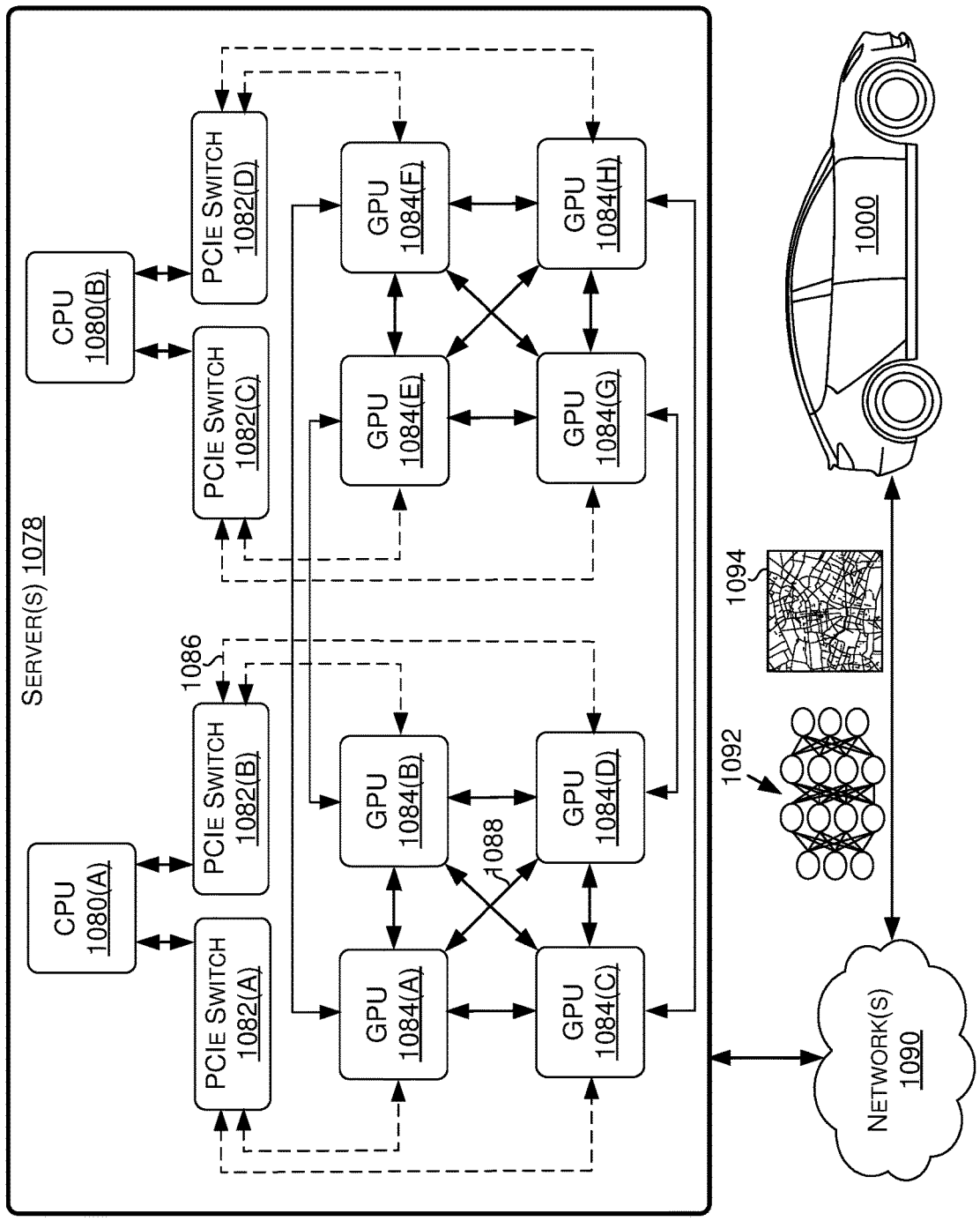
FIG. 10D is a system diagram for communication between cloud-based server(s) and the example autonomous vehicle of FIG. 10A, according to one or more embodiments of the present disclosure.

FIG. 10D is a system diagram for communication between cloud-based server(s) and the example autonomous vehicle 1000 of FIG. 10A, according to one or more embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced roadwork. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s)

1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Figure 11:
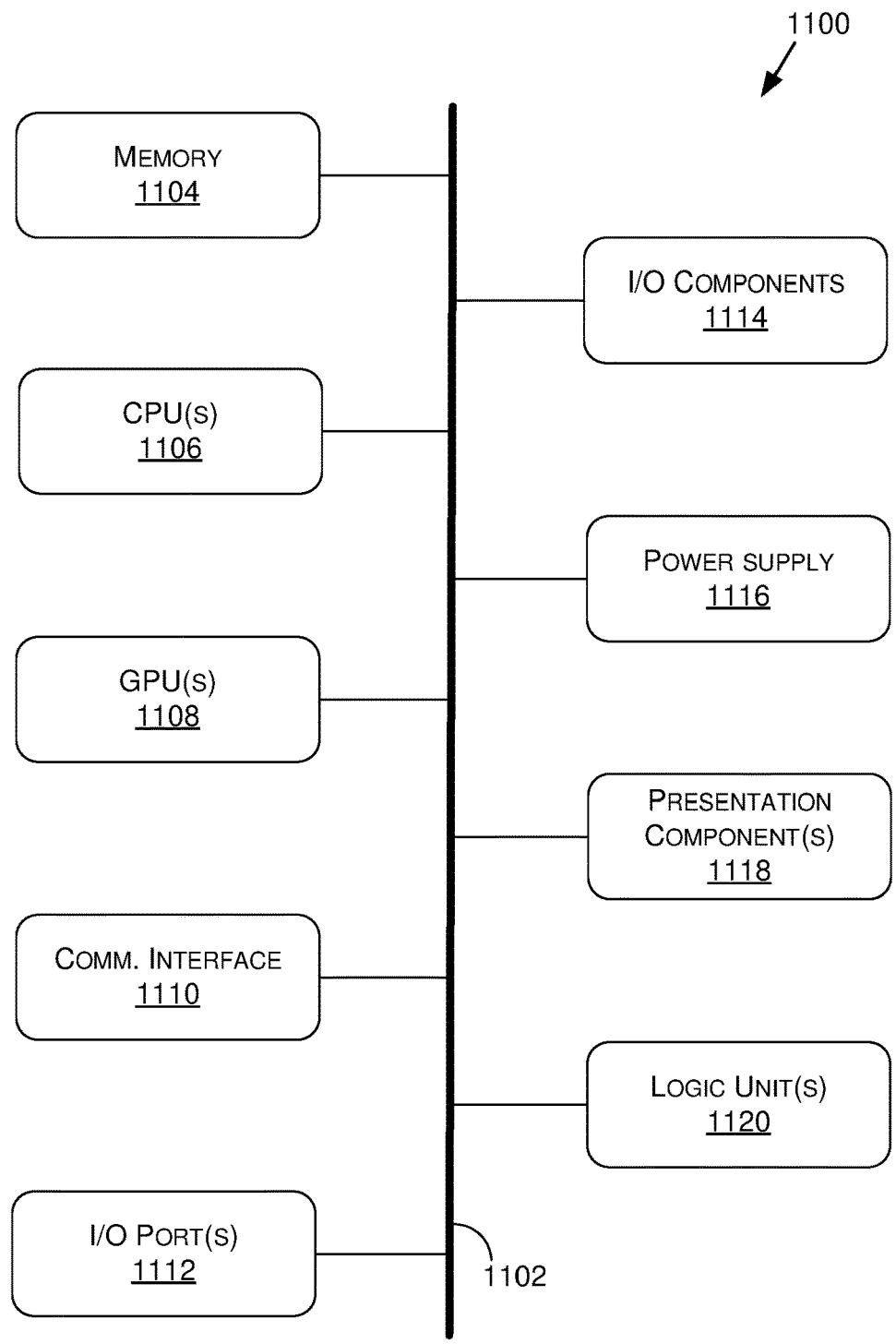
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, I/O ports 1112, input/output components 1114, a power supply 1116, one or more presentation components 1118 (e.g., display(s)), and one or more logic units 1120.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point, connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, including wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1112 may enable the computing device 1100 to be logically coupled to other devices including the I/O components 1114, the presentation component(s) 1118, and/or other components, some of which may be built into (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Additionally, use of the term "based on" should not be interpreted as "only based on" or "based only on." Rather, a first element being "based on" a second element includes instances in which the first element is based on the second element alone or on the second element and one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method to manage map data, the method comprising:
storing a map of a geographic area using an immutable tree, wherein the immutable tree comprises a plurality of nodes stored using a distributed hash table, the plurality of nodes including a plurality of map tiles, at least two map tiles of the plurality of map tiles covering different geographic subregions of the geographic area of the map;
hosting one or more binary large objects (BLOBs) that correspond to the plurality of map tiles in an origin data plane; and
making the one or more BLOBs available for distribution to one or more client devices using a content delivery network (CDN).

2. The method of claim 1, further comprising generating and storing a tile manifest for at least one map tile of the plurality of map tiles, the tile manifest including an index of content of the corresponding map tile and an identification of a corresponding geographic subregion of the geographic area of the map covered by the map tile.

3. The method of claim 2, wherein the index of content of the tile manifest includes one or more pointers to the content, at least one pointer of the one or more pointers including a hash of a corresponding BLOB included in the content.

4. The method of claim 1, further comprising:
generating a tile compatibility matrix that identifies for a given map tile one or more versions of one or more neighbor map tiles that are consistent with the given map tile;
receiving a request from a client device for the tile compatibility matrix; and
in response to receiving the request, sending the tile compatibility matrix to the client device.

5. The method of claim 4, wherein:
the tile compatibility matrix includes a n×n matrix;
a middle entry of the n×n matrix corresponds to the given map tile;
each surrounding entry of the n×n matrix corresponds to a different neighbor map tile of the given map tile; and
each entry includes a tuple of a hash of the corresponding map tile, one or more pointers to one or more tile manifest versions of each neighbor map tile that is consistent with the corresponding map tile, and a pointer to content of the corresponding map tile.

6. The method of claim 1, further comprising publishing a new version of a first map tile without rebuilding the map in its entirety.

7. The method of claim 6, wherein publishing the new version of the first map tile without rebuilding the map in its entirety includes:
publishing one or more updated BLOBs corresponding to the new version of the first map tile to the CDN;
generating a new version of a tile manifest for the new version of the first map tile;
pushing the new version of the tile manifest to the CDN;
generating a new version of a tile compatibility matrix for the new version of the first map tile, the new version of the tile compatibility matrix identifying for the new version of the first map tile one or more versions of one or more neighbor map tiles with which the new version of the first map tile is consistent;
pushing the new version of the tile compatibility matrix to the CDN; and
updating one or more tile manifests of the one more neighbor map tiles to include a backpointer to the new version of the first map tile.

8. The method of claim 6, wherein publishing the new version of the first map tile without rebuilding the map in its entirety includes:
adding the new version of the first map tile to a versioned index;
adding a back pointer in the new version of the first map tile from the new version of the first map tile to a current version of another map tile, wherein a prior version of the first map tile includes a back pointer from the prior version of the first map tile to the current version of the other map tile;
adding a back pointer in the current version of the other map tile from the current version of the other map tile to the new version of the first map tile; and
updating the versioned index to identify the new version of the first map tile as a latest version of the first map tile.

9. The method of claim 8, wherein adding the back pointer in the current version of the other map tile from the current version of the other map tile to the new version of the first map tile comprises appending the back pointer from the current version of the other map tile to the new version of the first map tile as a versioned entry to a vector of back pointers, each entry in the vector of back pointers pointing to a different version of the first map tile.

10. The method of claim 9, further comprising following a historical path that includes the prior version of the first map tile based on an entry in the vector of back pointers that points to the prior version of the first map tile and precedes the entry in the vector of back pointers that points to the new version of the first map tile.

11. The method of claim 1, further comprising implementing path copying to preserve one or more prior versions of the immutable tree when the immutable tree is updated.

12. A system comprising:
one or more processors to perform or control performance of operations comprising:
storing a map of a geographic area using an immutable tree that includes a plurality of nodes stored in a distributed hash table, the plurality of nodes including a plurality of map tiles, wherein at least two map tiles of the plurality of map tiles cover different geographic subregions of the geographic area of the map;
hosting binary large objects (BLOBs) corresponding to the plurality of map tiles in an origin data plane; and
distributing the BLOBs to client devices through a content delivery network (CDN).

13. The system of claim 12, further comprising generating and storing a tile manifest for one or more of the map tiles, at least one tile manifest including an index of content of the corresponding map tile and an identification of a corresponding geographic subregion of the geographic area of the map covered by the map tile.

14. The system of claim 13, wherein the index of content of at least one tile manifest includes one or more pointers to the content, at least one pointer of the one or more pointers including a hash of a corresponding BLOB included in the content.

15. The system of claim 12, the operations further comprising:
generating a tile compatibility matrix that identifies for a given map tile one or more versions of one or more neighbor map tiles with which the given map tile is consistent;
receiving a request from a client device for the tile compatibility matrix; and
in response to receiving the request, sending the tile compatibility matrix to the client device.

16. The system of claim 15, wherein:
the tile compatibility matrix includes a n×n matrix;
a middle entry of the n×n matrix corresponds to the given map tile;
at least one surrounding entry of the n×n matrix corresponds to a different neighbor map tile of the given map tile; and
at least one entry includes a tuple of a hash of the corresponding map tile, one or more pointers to one or more tile manifest versions of at least one neighbor map tile that is consistent with the corresponding map tile, and a pointer to content of the corresponding map tile.

17. The system of claim 12, further comprising publishing a new version of a first map tile without rebuilding the map in its entirety.

18. The system of claim 17, wherein the publishing the new version of the first map includes:
publishing one or more updated BLOBs corresponding to the new version of the first map tile to the CDN;
generating a new version of a tile manifest for the new version of the first map tile;
pushing the new version of the tile manifest to the CDN;
generating a new version of a tile compatibility matrix for the new version of the first map tile, the new version of the tile compatibility matrix identifying for the new version of the first map tile one or more versions of one or more neighbor map tiles that are consistent with the new version of the first map tile;
pushing the new version of the tile compatibility matrix to the CDN; and
updating one or more tile manifests of the one more neighbor map tiles to include a backpointer to the new version of the first map tile.

19. The system of claim 12, wherein the publishing the new version of the first map tile includes:
adding the new version of the first map tile to a versioned index;
adding a back pointer in the new version of the first map tile from the new version of the first map tile to a current version of another map tile, wherein a prior version of the first map tile includes a back pointer from the prior version of the first map tile to the current version of the other map tile, wherein adding the back pointer in the current version of the other map tile from the current version of the other map tile to the new version of the first map tile comprises appending the back pointer from the current version of the other map tile to the new version of the first map tile as a versioned entry to a vector of back pointers, at least one entry in the vector of back pointers pointing to a different version of the first map tile;
adding a back pointer in the current version of the other map tile from the current version of the other map tile to the new version of the first map tile;
updating the versioned index to identify the new version of the first map tile as a latest version of the first map tile; and
following a historical path that includes the prior version of the first map tile based on an entry in the vector of back pointers that points to the prior version of the first map tile and precedes the entry in the vector of back pointers that points to the new version of the first map tile.

20. The system of claim 12, the operations further comprising implementing path copying to preserve prior versions of the immutable tree when the immutable tree is updated.

21. The system of claim 12, wherein the system comprises one or more of:
a control system for an autonomous or semi-autonomous machine;
a perception system for an autonomous or semi-autonomous machine;
a system for performing simulation operations;
a system for performing deep learning operations;
a system for generating synthetic data;
a system for generating multi-dimensional assets using a collaborative content platform;
a system implemented using an edge device;
a system implemented using a robot;
a system incorporating one or more virtual machines (VMs);
a system implemented at least partially in a data center; or
a system implemented at least partially using cloud computing resources.

* * * * *